(12) United States Patent
Sekine

(10) Patent No.: US 7,561,198 B2
(45) Date of Patent: Jul. 14, 2009

(54) CMOS IMAGE SENSOR

(75) Inventor: Hirokazu Sekine, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 738 days.

(21) Appl. No.: 11/154,561

(22) Filed: Jun. 17, 2005

(65) Prior Publication Data
US 2005/0280729 A1 Dec. 22, 2005

(30) Foreign Application Priority Data
Jun. 18, 2004 (JP) ............................. 2004-180796

(51) Int. Cl.
*H04N 5/335* (2006.01)
(52) U.S. Cl. ...................... 348/308; 348/241; 257/72
(58) Field of Classification Search ................. 348/308, 348/294, 302, 320, 321; 257/72, 88
See application file for complete search history.

(56) References Cited

U.S. PATENT DOCUMENTS

| 5,345,266 | A | | 9/1994 | Denyer |
| 5,955,753 | A | * | 9/1999 | Takahashi .................... 257/292 |
| 5,973,311 | A | | 10/1999 | Sauer et al. |
| 6,091,449 | A | | 7/2000 | Matsunaga et al. |
| 6,674,094 | B2 | * | 1/2004 | Sekine .......................... 257/72 |
| 6,977,684 | B1 | * | 12/2005 | Hashimoto et al. .......... 348/294 |
| 2001/0052941 | A1 | * | 12/2001 | Matsunaga et al. .......... 348/308 |

FOREIGN PATENT DOCUMENTS

| JP | 2004-128193 | 4/2004 |
| JP | 2004-153253 | 5/2004 |

* cited by examiner

*Primary Examiner*—David L Ometz
*Assistant Examiner*—Ahmed A Berhan
(74) *Attorney, Agent, or Firm*—Oblon, Spivak, McClelland, Maier & Neustadt, P.c.

(57) ABSTRACT

A CMOS image sensor is provided in which a first group of output circuits arranged in a two-dimensional matrix and a second group of output circuits arranged in a two-dimensional matrix are arranged in the checkered pattern. The second group of output circuits is dislocated from the first group of output circuits by about one-half pitch of the pitchs in the horizontal and vertical directions.

20 Claims, 3 Drawing Sheets

CMOS IMAGE SENSOR

CROSS-REFERENCE TO RELATED APPLICATIONS

This application is based upon and claims the benefit of priority from the prior Japanese Patent Application No. 2004-180796, filed on Jun. 18, 2004; the entire contents of which are incorporated herein by reference.

BACKGROUND OF THE INVENTION

A conventional CMOS image sensor is known in which a plurality of photodiodes (hereinafter abbreviated to PD) are arranged in a matrix. Each of the PDs corresponds to one pixel, respectively, of a screen. In the CMOS image sensor, a plurality of output circuits is arranged in a matrix so as to fill in the gaps among these PDs.

The plurality of output circuits is arranged in a matrix at horizontal pitch (nPh) and vertical pitch (mPv) (where n and m are integers) among the PDs and commonly read out signals from two PDs arranged in the vertical direction. Further, a conventional CMOS sensor is also known in which signals of four PDs arranged in the vertical direction are commonly read out by one output circuit in order to obtain a higher degree of integration (see U.S. Pat. No. 6,091,449).

Meanwhile, the CMOS image sensors described are effective for a high degree of integration because signals of two or four PDs arranged in the vertical direction are read out by a common output circuit. Although a high degree of integration is effective in the column direction, that is, in the vertical direction of a screen, it is difficult in the horizontal direction because the plurality of output circuits is arranged in columns and pixel data from these portions cannot be detected. In particular, when CMOS image sensors are applied to a digital camera, it is necessary to make PD pitches in the horizontal and vertical directions the same, however, a problem occurs in that a high degree of integration only in the vertical direction is disadvantageous from the viewpoint of layout.

SUMMARY OF THE INVENTION

It is an object of the present invention to provide a CMOS image sensor to achieve the high integration in both the horizontal direction and the vertical direction.

From one viewpoint of the present invention, a CMOS image sensor is provided with a plurality of photoelectric conversion elements arranged in the two-dimensional matrix having rows and columns corresponding to a respective pixel in a screen at a prescribed pitch in the row and the column directions;

a first group of output circuits arranged in a two-dimensional matrix having rows and columns at a prescribed pitch, which is m times as long as the pitch of the two-dimensional matrix of the photoelectric conversion elements in the row direction and which is n times as long as the pitch of the two-dimensional matrix of the photoelectric conversion elements in the column direction so as to fill the gaps of these photoelectric conversion elements to commonly read out the plural photoelectric conversion elements, where m and n are integers; and a second group of output circuits arranged in the two-dimensional matrix having rows and columns at the same pitch as first group of output circuits among the first group of output circuits to commonly read out the plurality of photoelectric conversion elements arranged in the column direction, wherein the second group of output circuits is dislocated from the first group of output circuits by about one-half of their pitch in the row and column directions so as to form a checkered pattern.

Further, from another viewpoint of the present invention, the CMOS image sensor is provided with a plurality of photoelectric conversion elements corresponding to a respective pixel of a screen arranged in the two-dimensional matrix having rows and columns at a prescribed pitch in the row and column;

a first group of output circuits arranged in the two-dimensional matrix having rows and columns at a pitch, which is m times as long as the pitch of the two-dimensional matrix of the photoelectric conversion elements in the row direction, where m is an integer, and which is n times as long as the pitch of the two-dimensional matrix of the photoelectric conversion elements in the column direction, where n is an integer, so as to fill the gaps among the photoelectric conversion elements to commonly read out the plural photoelectric conversion elements arranged in the column direction;

a second group of output circuits arranged in the two-dimensional matrix having rows and columns and the same pitch as the first group of output circuits, which is dislocated from the first group of output circuits by about one-half of the pitch of the first group of output circuits in the row and column directions to read out the plural photoelectric conversion elements arranged in the column direction; and a plurality of floating junctions arranged in a two-dimensional matrix having rows and columns at a pitch, which is the same pitch as that of the photoelectric conversion elements in the row direction and which is two times as long as the pitch of the photoelectric conversion elements in the column direction by mutually connecting a pair of photoelectric conversion elements adjacent in the column direction selected from the plural photoelectric conversion arranged in the two dimensional matrix through the transfer gates, respectively; wherein the first group of output circuits selectively output charges of the photoelectric conversion elements, which belong to every other columns in the two-dimensional matrix of the floating junctions and which are connected to a pair of adjacent floating junctions in the vertical direction, and the the second group of output circuits selectively output charges of the photoelectric conversion elements, which belong to the rest of the columns in the two-dimensional matrix of the floating junctions and which are connected to a pair of adjacent floating junctions in the column direction.

According to the embodiments of present invention, a C-MOS image sensor can be obtained, in which high integration of the circuit is made in the horizontal and vertical directions.

DETAILED DESCRIPTION OF THE INVENTION

Figure 1:
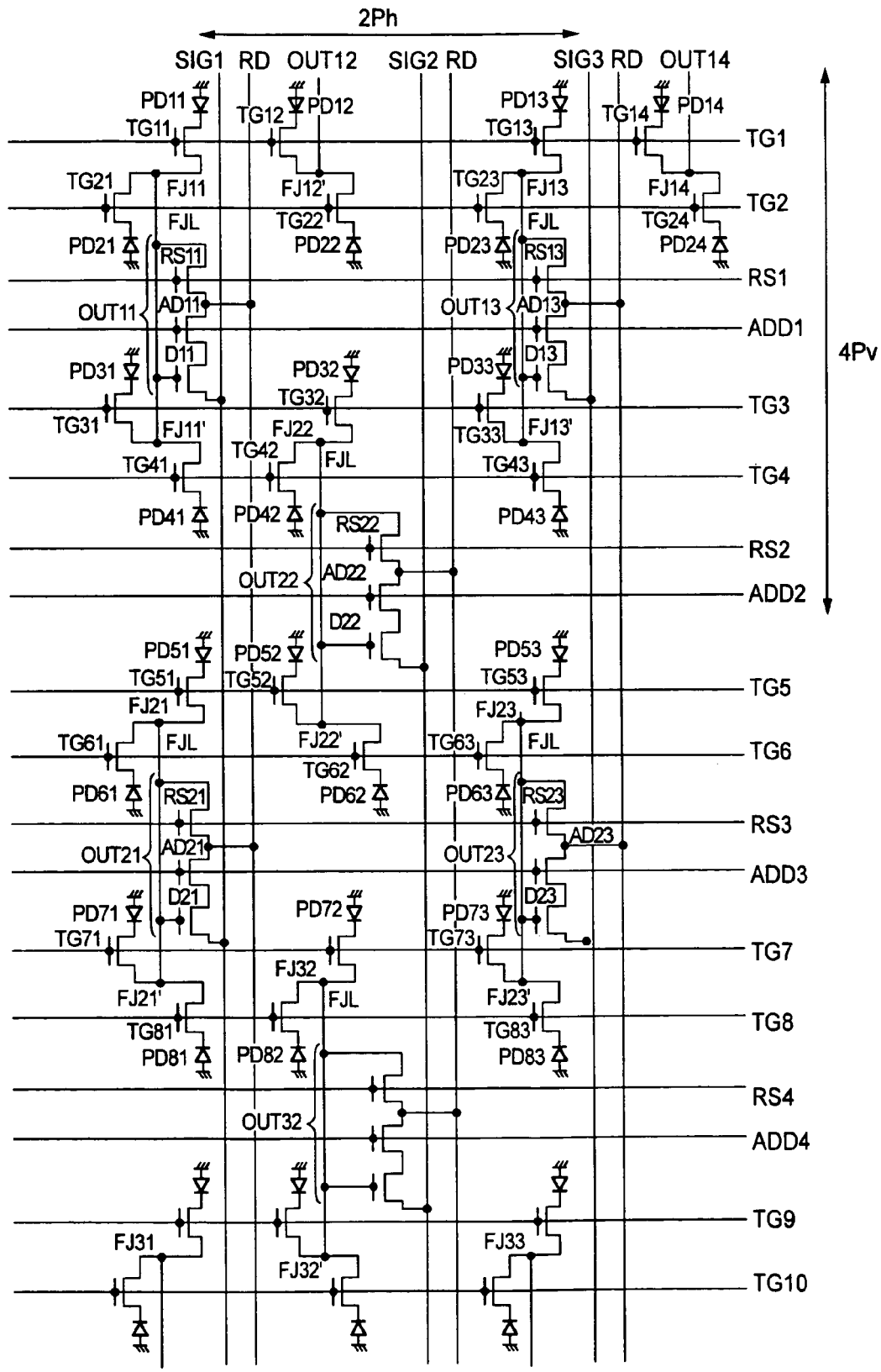
FIG. 1 is a circuit diagram showing a CMOS image sensor according to the embodiment of the present invention.
Figure 2:
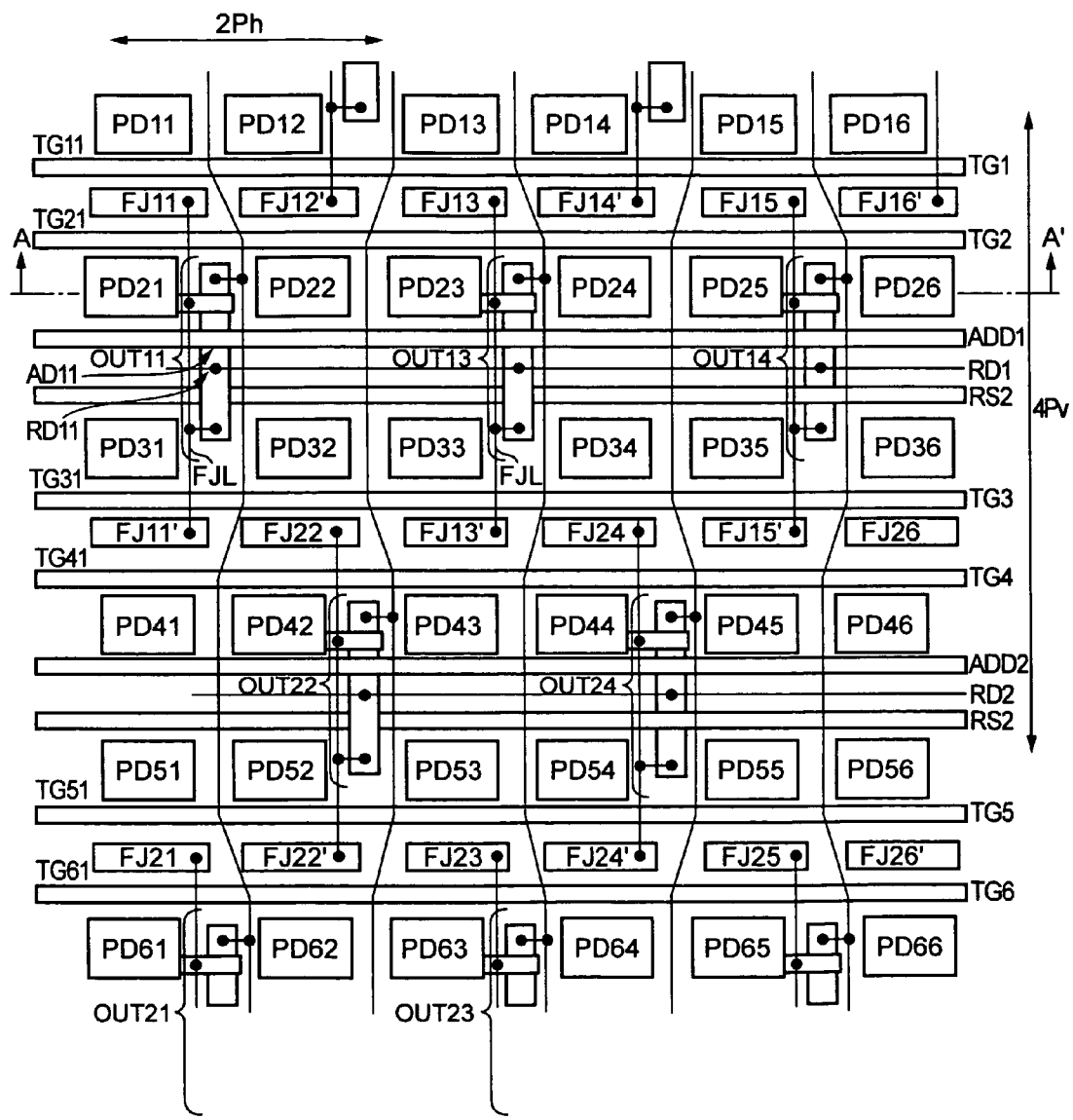
FIG. 2 is a diagram showing an outline of an integrated circuit pattern of the CMOS image sensor according to the embodiment of the present invention.

An embodiment of the present invention will be explained below referring to the attached drawings. FIG. 1 is a circuit diagram of a CMOS image sensor according to an embodiment of the present invention and FIG. 2 is a plane pattern diagram showing an integrated circuit of the CMOS image sensor shown in FIG. 1. The image sensor is a 4-pixel 1-cell type sensor. As shown in the diagrams, includes plural photodiodes PD11, PD12, . . . PD16, PD21, PD22, . . . PD26 are provided, which are arranged in a two-dimensional matrix at a prescribed pitches Ph and Pv in the horizontal direction (the row direction) and the vertical direction (the column direction) respectively in the image sensor. These photodiodes are one of photoelectric conversion elements to convert lights into electric signals. As photoelectric conversion elements in another configuration, there are also MOS capacitors using transparent electrodes as gates in addition to photodiodes. Accordingly, photodiodes or other photoelectric conversion element can be used as photoelectric conversion element in the present invention. These photodiodes form each pixel in a screen formed by the image sensor.

To fill gaps among these photodiodes PD11, PD12, . . . PD16, PD21, PD22 . . . PD26, . . . , the first group of output circuits OUT11, OUT13, OUT15, . . . OUT21, OUT23, OUT25, . . . is arranged in another two-dimensional matrix. That is, the first group of output circuits OUT11, OUT13, OUT15, . . . , OUT21, OUT23, OUT25, . . . are arranged in the horizontal direction at a pitch, which is m times as long as the prescribed pitch Ph, for example, two times (2 Ph) as long as the pitch Ph. The first group of output circuits OUT11, OUT13, OUT15, . . . , OUT21, OUT23, OUT25, . . . are also arranged in the vertical direction at a pitch, which is n times as long as the prescribed repetitive pitch Pv, for example, 4 times 4 Pv. Accordingly, the first group of output circuits OUT11, OUT13, OUT15, . . . OUT21, OUT23, OUT25, . . . are arranged in the two-dimensional matrix in the horizontal direction at a repetitive pitch 2 PH and in the vertical direction at a repetitive pitch 4 Pv. The first group of output circuits OUT11, OUT13, OUT15, . . . OUT21, OUT23, OUT25, . . . commonly read out output signals of plural photodiodes, for example, 4 photodiodes arranged in the column direction, respectively. For example, the output circuit OUT11 reads out the output signals of photodiodes PD11, PD21, PD31 and PD41 commonly. Further, the output circuit OUT13 reads out the output signals of photodiodes PD13, PD23, PD33 and PD43 commonly.

Thus, among the first group of output circuits arranged in the two-dimensional matrix, a second group of output circuits OUT12, OUT14 (not shown), . . . , OUT22, OUT24, . . . , OUT32, OUT34 (not shown) are similarly arranged in the tow-dimensional matrix. That is, the second group of output circuits OUT12, OUT14 (not shown), . . . , OUT22, OUT24, . . . , OUT32, OUT34, . . . are arranged in the two-dimensional matrix at the same repetitive pitch 2 Ph in the same horizontal direction and 4 Pv in the vertical direction as the first group of output circuits. However, the second group of output circuits are arranged at the positions shifted from the first group of output circuits, as a whole, by about ½ of the repetitive pitch of the first group of output circuits in the horizontal direction and the vertical direction respectively. As the result, the first group of output circuits and the second group of output circuits are arranged in the checkered pattern as a whole.

For example, the output circuit OUT22 belonging to the second group of output circuits is arranged at a middle position between the output circuits OUT11 and OUT13 belonging to the first group of output circuits in the horizontal direction and at a middle position between OUT11 and OUT21 belonging to the first group of output circuits in the vertical direction. That is, the second group of output circuits is arranged at the position displaced by about ½ of the repetitive pitches in the horizontal direction and the vertical direction of the first group of output circuits. As a result, a so-called checkered pattern arrangement is formed by the OUT22 of the second group of output circuits and OUT11, OUT13, OUT21 and OUT23 of the first group of output circuits.

As described above, the image sensor in the embodiment is a four-pixel for one-cell type sensor. The repetitive unit of one cell of the image sensor including four pieces of photodiodes and an output circuit for reading out signal charges of these photodiodes is formed by two pixels (2 Ph) in the horizontal direction and four pixels (4 Pv) in the vertical direction. Here, Ph and Pv are averaged pixel pitches. As a result, it became possible to achieve the high integration in both the horizontal direction and the vertical direction.

This image sensor is a four-pixel for one-cell type sensor as described above. A structure of a unit cell forming the image sensor will be explained below. The output circuit OUT11 commonly reads out output signals of four pieces photodiodes PD11, PD21, PD31 and PD41 arranged in the vertical direction. Each of these photodiodes is connected to read-out gates TG11, TG21, TG31 and TG41, respectively, which are arranged adjacently with respect to the vertical direction. These read-out gates TG11, TG21, TG31 and TG41 are composed of MOS transistors, and respective gate electrodes are connected to gate control lines TG1, TG2, TG3 and TG4 that are connected in the horizontal direction.

The read-out gate TG 11 is connected to the adjacent photodiode PD11. Similarly, the read-out gate TG21 is connected to the adjacent photodiode PD21. Between the read-out gate TG11 and the read-out gate TG21, a floating junction FJ11 is formed adjacent to them, respectively. The read-out gates TG11 and TG21 open the gates when transfer pulses are applied to the gate control lines TG1 and TG2 and transfer the output signal charges accumulated in the photodiode PD11 or PD21 to the floating junction FJ11.

Similarly, the read-out gate TG31 is connected to the adjacent photodiode PD31 and the read-out gate TG4 is connected to the adjacent photodiode PD41. Between the read-out gates TG31 and TG41, a floating junction FJ' is formed adjacent to them, respectively. The read-out gates TG31 and TG41 open the gates when transfer pulses are applied to the gate control lines TG3 and TG4, and transfer the output signal charges accumulated in the photodiode PD31 or PD41 to the floating junctions FU11'. The floating junctions FJ11 and FJ11' are connected to each other with a floating junction line FJL.

The output circuit OUT11 is composed of a driver transistor D11, an address transistor AD11, and a reset transistor RS11. The floating junction FJ11 and the floating junction FJ11' are connected to the gate electrode of the driver transistor D11 and the source electrode of the reset transistor RS11 included in the output circuit OUT11 via the floating junction line FJL. Further, the source electrode of the driver transistor D11 included in the output circuit OUT11 is connected to a signal line SIG1 extending in the vertical direction. Further, the drain electrode of the rest transistor RS11 included in the output circuit OUT11 is connected to the drain electrode of the address transistor AD11 and is also connected to a reset drain voltage line RD extending in the vertical direction. The gate electrode of the reset transistor RS11 is connected to the reset line RS1 extending in the horizontal direction.

The source electrode of the address transistor AD11 included in the output circuit OUT11 is connected to the drain electrode of the driver transistor D11 and its gate electrode is connected to the address line ADD1 extending in the horizontal direction.

The output circuit OUT13 included in the first group of output circuits is used to read out output signals of the photodiodes PD13, PD23, PD33 and PD43 arranged in the horizontal direction commonly. Signal charges of the photodiodes PD13 and PD43 are transferred to the floating junction FJ13 through the read-out gates TG13 and TG23. Signal charges of the photodiodes PD33 and PD43 are transferred to the floating junction FJ13' through the read-out gates TG33 and TG43. The circuit configuration of the first output circuit OUT33 and the connections with the photodiodes and the read-out gates are almost the same as those of the output circuit OUT11 described above.

Further, the output circuit OUT21 included in the first group of output circuits is commonly used to read out output signals of the photodiodes PD51, PD61, PD71 and PD81 arranged in the vertical direction. Signal charges of the photodiodes PD51 and PD61 are transferred to the floating junction FJ21 through the read-out gates TG51 and TG61. Signal charges of the photodiodes PD71 and PD81 are transferred to the floating junction FJ11' through the read-out gates TG71 and TG81. The circuit configuration of the first output circuit OUT21 and the connection with the photodiodes and the read-out gates are almost the same as those for the output circuit OUT11 described above.

Further, the output circuit OUT23 included in the first group of output circuits is commonly used to read out the output signals of the photodiodes PD53, PD63, PD73 and PD83 arranged in the vertical direction. Signal charges of the photodiodes PD53 and PD63 are transferred to the floating junction FJ23 through the read-out gates TG53 and TG63. Signal charges of the photodiodes PD73 and PD83 are transferred to the floating junction FJ23' through the read-out gates TG73 and TG83. The circuit configuration of the first output circuit OUT23 and the connections of the photodiodes and read-out gates are also almost the same as those of the output circuit OUT11 described above.

On the other hand, although the output circuits OUT12, OUT14, OUT22 and OUT24 belong to the second group of output circuits, only parts of the output circuits OUT12 and OUT14 are shown in FIG. 2. That is, the output circuit OUT12 is used to read out the signal charges of the photodiodes PD12 and PD22. The output circuit OUT14 is used to read out the signal charges of the photodiodes PD14 and PD24. On the contrary, the output circuits OUT22 and OUT24 are illustrated as circuits containing all elements. That is, the output circuit OUT22 is used to commonly read out the photodiodes PD32, PD42, PD52 and PD62 arranged in the vertical direction. Signal charges of the photodiodes PD32 and PD42 are transferred to the floating junction FJ22 through the read-out gates TG32 and TG42. Signal charges of the photodiodes PD52 and PD62 are transferred to the floating junction FJ22' through the read-out gates TG52 and TG62. The circuit configuration of the second output circuit OUT22 and the connections with the photodiodes and the read-out gates are also almost the same as those of the output circuit OUT11 contained in the first group of output circuits described above.

The output circuit OUT24 included in the second circuit group is used to commonly read out the photodiodes PD34, PD44, PD54 and PD64 arranged in the vertical direction. Signal charges of the photodiodes PD34 and PD44 are transferred to the floating junction FJ24 through the read-out gates TG3 and TG4. Signal charges of the photodiodes PD54 and PD64 are transferred to the floating junction FJ24' through the read-out gates TG5 and TG6. The circuit configuration of the second output circuit 24 and the connections with the photodiodes and the read-out gates are almost the sane as those of the output circuit OUT11 included in the first group of output circuits described above.

The operations of the CMOS image sensor involved in the embodiment of the present invention are described below. As an example, how to read out signals of the photodiodes PD31, PD32 and PD33 on one horizontal line when the gate control line TG3 is turned ON will be explained. The signal charges accumulated in the photodiodes PD31, PD32 and PD32 are transferred to the FJ11', FJ22 and FJ13' when the TG3 is turned ON. Prior to transfer of the signal charge, the reset transistors RS11, RS22 and RS13 are turned ON by applying RS pulse to the reset lines RS1 and RS2 and thereby, the floating junctions FJ11', FJ22 and FJ13' are set at the RS drain voltage. Thereafter, the reset lines RS1 and RS2 are turned off and put in the floating state.

The signal charges change potential voltages of the floating junctions FJ11', FJ22 and FJ13' and thus turn the driver transistors D11, D22 and D13 connected into ON state by modulating potential voltages of their gate electrodes. In order to operate the output circuits OUT11, OUT22 and OUT13, the address transistors AD11, AD22 and AD13 are turned ON by applying an address pulse to the address lines ADD1 and ADD2, respectively. As a result, the read-out output signals of the photodiodes PD31, PD32 and PD33 are output through signal lines SIG1, SIG2 and SIG3.

In the next, FIG. 2 shows a plane view of a circuit pattern when the image sensor shown in FIG. 1 is formed by an integrated circuit. In FIG. 2, the same reference symbols as shown in FIG. 1 are assigned to corresponding component elements to those shown in FIG. 1. In FIG. 2, for example, the output circuit OUT11 and four photodiodes PD11, PD21, PD31 and PD41 arranged in the vertical direction form the unit cell for forming the image sensor. Here, the positions of the photodiodes PD11 and PD41 in the horizontal direction are somewhat shifted from the positions of the photodiodes PD21 and PD31 in the horizontal positions. This is because the output circuits are arranged in the checkered pattern and the photodiodes are arranged to fill the gaps between the output circuits. Such irregularity in the pixel arrangement due to the output circuits arranged in the checkered pattern can be corrected by arranging micro-lenses, which are normally used for improving the convergence rate, at an equal space and by expanding the convergence area at the opening corresponding to the photodiodes. Further, the irregularity may be further corrected by forming inner lenses between the micro-lens and the photodiodes to change the optical path.

Figure 3:
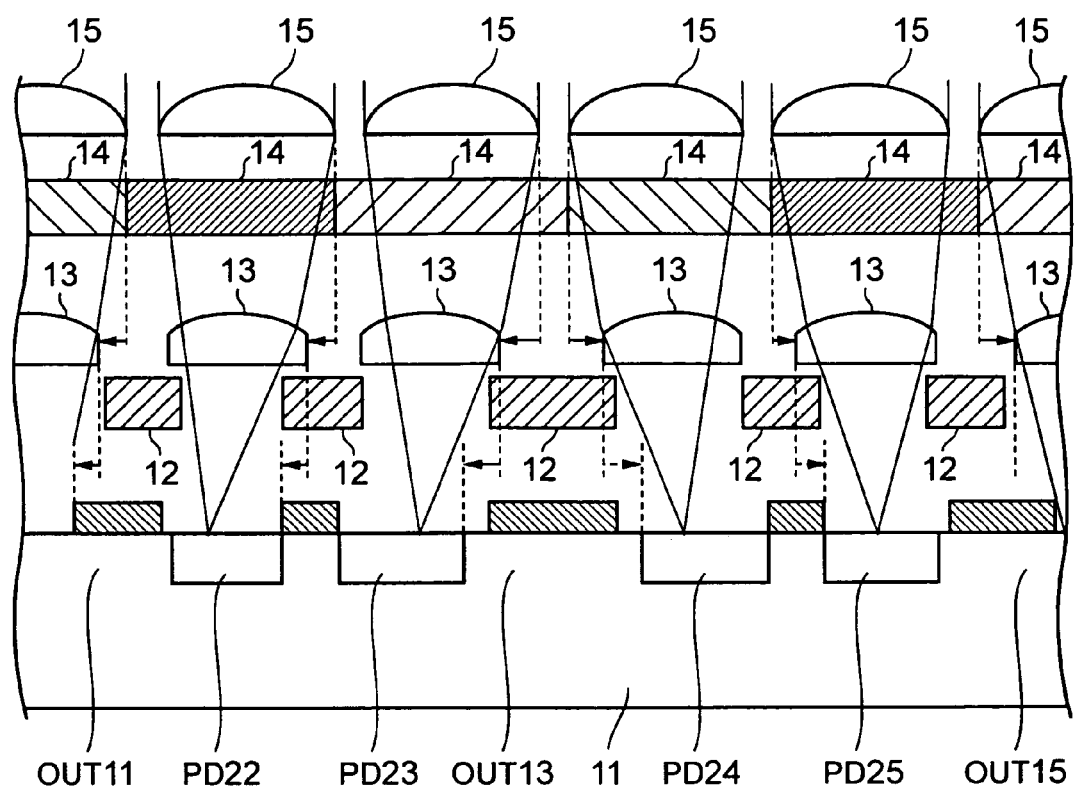
FIG. 3 is sectional view showing a part of a structure of the CMOS image sensor according to the embodiment of the present invention.

FIG. 3 is a partially sectional view showing the configuration of an image sensor using micro-lenses and inner lenses for correcting the irregularity of the pixel array. FIG. 3 is a sectional view along the chained line A-A' of FIG. 2 and is a partially sectional view including the output circuit OUT13 and the photodiodes PD22, PD23, PD24 and PD25 on both sides of the output circuit OUT13. On the surface of a semiconductor substrate 11, photodiodes PD22, PD23, PD24 and PD25 are formed corresponding to pixels. On the upper part, a light shielding film layer 12 is provided to form openings for incident light to the photodiodes. Above the light shielding film layer 12, inner lenses 13 are form at positions corresponding to the openings of the light shielding film layer 12. This inner lenses 13 are made of, for example, a nitride film having a larger refractive index than a resist material. Above the inner lenses 13, a color filter layer 14 is formed. The color filer layer 14 is a filter for selecting a wavelength of a transmitting light such as red, green and blue. On the upper surface of the color filter layer 14, micro-lenses corresponding to pixels are arranged at an equal space. These micro-lenses are made of, for example, acrylic resins.

In the image sensor thus composed, micro-lenses 15 are arranged corresponding to pixels almost at an equal space. On the other hand, the inner lenses are arranged at an almost equal space over the photodiodes but are arranged at narrow space over the output circuit OUT13. Thus, the light path of the light focused by the micro-lenses 15 is changed by the inner lenses 13 and led to the opening formed on the light shielding film layers 12. Thus, the irregularity of the pixel array can be corrected.

As described above, in the CMOS image sensor according to the embodiment of the present invention, two pixels are arranged for each output circuit in the horizontal direction. Thus, when compared with a conventional CMOS image sensor having one pixel per each output circuit, the number of output circuits per pixel is reduced to one half. Thus, the degree of integration in the horizontal direction is improved. Further, as the number of pixels and lines in the vertical direction are the same as the conventional CMOS image sensor, it is possible to well balance the pixel arrangement in the horizontal and vertical directions, which is effective for high integration and high performance. Further, as signal lines and output circuit lines are extending in the vertical direction on both sides of all pixels, the light shielding effect is improved.

The explanation described above is for the embodiment of a C-MOS image sensor in the four-pixel one-cell structure. However, the present invention is also applicable to the structures of two-pixels for one-cell, six-pixels for one-cell and eight-pixels for one-cell.

What is claimed is:

1. A CMOS image sensor comprising:
   a plurality of photoelectric conversion elements arranged in the two-dimensional matrix having rows and columns corresponding to a respective pixel in a screen at a prescribed pitch in the row and the column directions;
   a first group of output circuits arranged in a two-dimensional matrix having rows and columns at a prescribed pitch, which is m times as long as the pitch of the two-dimensional matrix of the photoelectric conversion elements in the row direction and which is n times as long as the pitch of the two-dimensional matrix of the photoelectric conversion elements in the column direction so as to fill the gaps of these photoelectric conversion elements to commonly read out the plural photoelectric conversion elements, where m and n are integers; and
   a second group of output circuits arranged in the two-dimensional matrix having rows and columns at the same pitch as first group of output circuits among the first group of output circuits to commonly read out the plurality of photoelectric conversion elements arranged in the column direction, wherein the second group of output circuits is dislocated from the first group of output circuits by about one-half of their pitch in the row and column directions so as to form a checkered pattern, wherein
   a plural floating junctions are provided, each one of which is formed between a pair of vertically adjacent photoelectric conversion elements selected from the plural photoelectric conversion elements arranged in the two-dimensional matrix, and which is connected to the pair of vertically adjacent photoelectric conversion elements through a transfer gate formed adjacent to the pair of the photoelectric conversion elements,
   the plural floating junctions are arranged in the two-dimensional matrix having about 2 times as long as the pitch of the two-dimensional matrix of the photoelectric conversion elements in the vertical direction, the output circuits belonging to the first group selectively output charges of plural photoelectric conversion elements connected to adjacent pair of floating junctions, which belong to every other vertical lines in the two-dimensional matrix of the floating gates and arranged in the vertical direction,
   the output circuits belonging to the second group selectively output charges of plural photoelectric conversion elements connected to adjacent pair of floating junctions connected to adjacent pair of floating junctions, which belong to the remaining vertical lines in the two-dimensional matrix of the floating gates and arranged in the vertical direction, wherein
   the pair of adjacent floating junctions arranged in the vertical direction are connected to each other, the output circuits belonging to the first group or the second group include driver transistors, reset transistors and address transistors, potentials of the pair of floating junctions are reset through the reset transistors and accumulated electric charges are read out through the driver transistors; and wherein
   the reset transistor is connected to one of plural reset drain voltage lines provided corresponding to the vertical lines of the two-dimensional matrix of the photoelectric conversion elements and the driver transistor is connected to one of plural signal output lines provided corresponding to the vertical lines of the two-dimensional matrix of the photoelectric conversion elements.

2. A CMOS image sensor according to claim 1, wherein the transfer gates are controlled to open and close by plural transfer lines provided corresponding to horizontal lines of the two-dimensional matrix of the photoelectric conversion elements and transfer charges of the photoelectric conversion elements to a plurality of floating junctions.

3. A CMOS image sensor according to claim 1, wherein the output circuits are used to commonly read out signal charges accumulated in the plural photodiodes arranged in the horizontal direction and the vertical direction.

4. A CMOS image sensor according to claim 1, wherein the output circuits are used to commonly read out signal charges accumulated in four photodiodes arranged in the adjacent two vertical lines and adjacent four horizontal lines.

5. A CMOS image sensor according to claim 1, wherein the irregularity of pixel arrangement because the output circuits are arranged in the checkered pattern was corrected by micro-lenses.

6. A CMOS image sensor according to claim 1, wherein the irregularity of the pixel arrangement is corrected by micro-lenses and inner lenses.

7. A CMOS image sensor comprising:
   a plurality of photoelectric conversion elements corresponding to a respective pixel of a screen arranged in the two-dimensional matrix having rows and columns at a prescribed pitch in the row and column;
   a first group of output circuits arranged in the two-dimensional matrix having rows and columns at a pitch, which is m times as long as the pitch of the two-dimensional matrix of the photoelectric conversion elements in the row direction, where m is an integer, and which is n times as long as the pitch of the two-dimensional matrix of the photoelectric conversion elements in the column direction, where n is an integer, so as to fill the gaps among the photoelectric conversion elements to commonly read out the plural photoelectric conversion elements arranged in the column direction;

a second group of output circuits arranged in the two-dimensional matrix having rows and columns and the same pitch as the first group of output circuits, which is dislocated from the first group of output circuits by about one-half of the pitch of the first group of output circuits in the row and column directions to read out the plural photoelectric conversion elements arranged in the column direction; and a plurality of floating junctions arranged in a two-dimensional matrix having rows and columns at a pitch, which is the same pitch as that of the photoelectric conversion elements in the row direction and which is two times as long as the pitch of the photoelectric conversion elements in the column direction by mutually connecting a pair of photoelectric conversion elements adjacent in the column direction selected from the plural photoelectric conversion arranged in the two dimensional matrix through the transfer gates, respectively, wherein the first group of output circuits selectively output charges of the photoelectric conversion elements, which belong to every other columns in the two-dimensional matrix of the floating junctions and which are connected to a pair of adjacent floating junctions in the vertical direction, and the second group of output circuits selectively output charges of the photoelectric conversion elements, which belong to the rest of the columns in the two-dimensional matrix of the floating junctions and which are connected to a pair of adjacent floating junctions in the column direction; and wherein the pair of adjacent floating junctions arranged in the vertical direction are connected to each other, the output circuits belonging to the first group or the second group include driver transistors, reset transistors and address transistors, potentials of the pair of floating junctions are reset through the reset transistors and accumulated electric charges are read out through the driver transistors.

8. A CMOS image sensor according to claim 7, wherein the transfer gates are controlled to open and close by plural transfer lines provided corresponding to horizontal lines of the two-dimensional matrix of the photoelectric conversion elements and transfer charges of the photoelectric conversion elements to a plurality of floating junctions.

9. A CMOS image sensor according to claim 7, wherein the address transistors and the driver transistors are connected in series between the reset drain voltage lines and the signal output lines.

10. A CMOS image sensor according to claim 7, wherein each of the photoelectric conversion elements is a photodiode.

11. A CMOS image sensor according to claim 7, wherein the irregularity of pixel arrangement because the output circuits are arranged in the checkered pattern was corrected by micro-lenses.

12. A CMOS image sensor according to claim 8, wherein the reset transistor is connected to one of plural reset drain voltage lines provided corresponding to the vertical lines of the two-dimensional matrix of the photoelectric conversion elements and the driver transistor is connected to one of plural signal output lines provided corresponding to the vertical lines of the two-dimensional matrix of the photoelectric conversion elements.

13. A CMOS image sensor according to claim 8, wherein the reset transistor is connected to one of plural reset lines provided corresponding to every plural horizontal lines of the two-dimensional matrix of the photoelectric conversion elements, and the address transistor is connected to one of the plural address lines provided corresponding to every plural horizontal lines of the two-dimensional matrix of the photoelectric conversion elements.

14. A CMOS image sensor according to claim 8, wherein the irregularity of pixel arrangement because the output circuits are arranged in the checkered pattern was corrected by micro-lenses.

15. A CMOS image sensor comprising:

a plurality of photoelectric conversion elements arranged in the two-dimensional matrix having rows and columns corresponding to a respective pixel in a screen at a prescribed pitch in the row and the column directions;

a first group of output circuits arranged in a two-dimensional matrix having rows and columns at a prescribed pitch, which is m times as long as the pitch of the two-dimensional matrix of the photoelectric conversion elements in the row direction and which is n times as long as the pitch of the two-dimensional matrix of the photoelectric conversion elements in the column direction so as to fill the gaps of these photoelectric conversion elements to commonly read out the plural photoelectric conversion elements, where m and n are integers; and a second group of output circuits arranged in the two-dimensional matrix having rows and columns at the same pitch as first group of output circuits among the first group of output circuits to commonly read out the plurality of photoelectric conversion elements arranged in the column direction, wherein the second group of output circuits is dislocated from the first group of output circuits by about one-half of their pitch in the row and column directions so as to form a checkered pattern, wherein a plural floating junctions are provided, each one of which is formed between a pair of vertically adjacent photoelectric conversion elements selected from the plural photoelectric conversion elements arranged in the two-dimensional matrix, and which is connected to the pair of vertically adjacent photoelectric conversion elements through a transfer gate formed adjacent to the pair of the photoelectric conversion elements, the plural floating junctions are arranged in the two-dimensional matrix having about 2 times as long as the pitch of the two-dimensional matrix of the photoelectric conversion elements in the vertical direction, the output circuits belonging to the first group selectively output charges of plural photoelectric conversion elements connected to adjacent pair of floating junctions, which belong to every other vertical lines in the two-dimensional matrix of the floating gates and arranged in the vertical direction, the output circuits belonging to the second group selectively output charges of plural photoelectric conversion elements connected to adjacent pair of floating junctions connected to adjacent pair of floating junctions, which belong to the remaining vertical lines in the two-dimensional matrix of the floating gates and arranged in the vertical direction, wherein the pair of adjacent floating junctions arranged in the vertical direction are connected to each other, the output circuits belonging to the first group or the second group include driver transistors, reset transistors and address transistors, potentials of the pair of floating junctions are reset through the reset transistors and accumulated electric charges are read out through the driver transistors; and wherein the reset transistor is connected to one of plural reset lines provided corresponding to every plural horizontal lines of the two-dimensional matrix of the photoelectric conversion elements, and the address transistor is connected to one of the plural address lines provided corresponding to every plural horizontal lines of the two-dimensional matrix of the photoelectric conversion elements.

16. A CMOS image sensor according to claim 15, wherein the transfer gates are controlled to open and close by plural transfer lines provided corresponding to horizontal lines of the two-dimensional matrix of the photoelectric conversion elements and transfer charges of the photoelectric conversion elements to a plurality of floating junctions.

17. A CMOS image sensor according to claim 15, wherein the output circuits are used to commonly read out signal charges accumulated in the plural photodiodes arranged in the horizontal direction and the vertical direction.

18. A CMOS image sensor according to claim 15, wherein the output circuits are used to commonly read out signal charges accumulated in four photodiodes arranged in the adjacent two vertical lines and adjacent four horizontal lines.

19. A CMOS image sensor according to claim 15, wherein the irregularity of pixel arrangement because the output circuits are arranged in the checkered pattern was corrected by micro-lenses.

20. A CMOS image sensor according to claim 15, wherein the irregularity of the pixel arrangement is corrected by micro-lenses and inner lenses.

* * * * *